US007082443B1

(12) United States Patent
Ashby

(10) Patent No.: US 7,082,443 B1
(45) Date of Patent: Jul. 25, 2006

(54) METHOD AND SYSTEM FOR UPDATING GEOGRAPHIC DATABASES

(75) Inventor: Richard A. Ashby, Blue River, WI (US)

(73) Assignee: Navteq North America, LLC, Chicago, IL (US)

( * ) Notice: Subject to any disclaimer, the term of this patent is extended or adjusted under 35 U.S.C. 154(b) by 355 days.

(21) Appl. No.: 10/201,098

(22) Filed: Jul. 23, 2002

(51) Int. Cl.
*G06F 17/30* (2006.01)

(52) U.S. Cl. .................. 707/201; 707/4; 707/100; 707/200; 342/357.13; 701/23; 701/201; 701/208

(58) Field of Classification Search ................ 345/435, 345/626; 707/2, 100, 102, 104.1, 200, 201
See application file for complete search history.

(56) References Cited

U.S. PATENT DOCUMENTS

| | | | | |
|---|---|---|---|---|
| 5,880,741 A | * | 3/1999 | Takeuchi | .................... 345/626 |
| 5,893,113 A | * | 4/1999 | McGrath et al. | ............ 707/200 |
| 5,915,098 A | | 6/1999 | Palmer et al. | ......... 395/200.77 |
| 5,968,109 A | | 10/1999 | Israni et al. | |
| 6,047,280 A | | 4/2000 | Ashby et al. | |
| 6,075,467 A | | 6/2000 | Ninagawa | .................... 340/995 |
| 6,230,098 B1 | | 5/2001 | Ando et al. | .................. 701/208 |
| 6,453,233 B1 | | 9/2002 | Kato | |
| 6,546,334 B1 | | 4/2003 | Fukuchi et al. | ............. 701/208 |
| 6,636,802 B1 | | 10/2003 | Nakano et al. | ............. 701/208 |
| 2002/0029224 A1 | | 3/2002 | Carlsson | |
| 2002/0059304 A1 | | 5/2002 | Nishiyama | |
| 2002/0091485 A1 | | 7/2002 | Mikuriya et al. | ........... 701/208 |
| 2003/0028315 A1 | | 2/2003 | Miyahara | |
| 2003/0028316 A1 | | 2/2003 | Miyahara | |

OTHER PUBLICATIONS

Natesan, Senthil, Crane, Aaron, Robare Philip, U.S. Appl. No. 09/838,094, filed Apr. 19, 2001, entitled: Navigation System with Distributed Computing Architecture.
Kim, K. et al., A Geographic Differential Script File Method for Distributed Geographic Information Systems, *IEICE Transactions on Infromation and Systems*, vol. E82-D, No. 1, pp. 113-118, XP002323089, (Jan. 1999).

* cited by examiner

*Primary Examiner*—Shahid Alam
*Assistant Examiner*—Fred I. Ehichioya
(74) *Attorney, Agent, or Firm*—Frank J. Kozak; Jon D. Shutter; Grace L. O'Brien

(57) ABSTRACT

A method and system for updating geographic databases used in systems that provide navigation-related features are disclosed. An original version of a geographic database is formed in which the data are organized into parcels. An updated version of the geographic database is formed that includes updated data. The updated version is organized into parcels so that the data in each parcel of the updated geographic database represent the same features that were represented in a corresponding one of the parcels of the original version. Incremental update transactions are formed that identify the differences between the parcels of data contained in the updated version of the geographic database relative to the parcels in the original version. The incremental update transactions are transmitted to the systems that provide navigation-related features where they are used to form updated parcels which are used in place of the corresponding parcels from the original version.

11 Claims, 11 Drawing Sheets

(baseline parcel)

(updated parcel)

US 7,082,443 B1

METHOD AND SYSTEM FOR UPDATING GEOGRAPHIC DATABASES

BACKGROUND OF THE INVENTION

The present invention relates to a system and method for updating geographic databases used by computing platforms that provide navigation-related features or services.

Navigation systems are provided on various different computer platforms. For example, a navigation system can be a standalone system or a networked system. In a standalone navigation system, the software applications, geographic data, and hardware are combined at a single location. A standalone system may be installed in a vehicle or carried by a person. In a networked navigation system, some of the software or geographic data are located with the hardware with the user and some of the software or geographic data are located remotely and accessed over a communications system. A navigation system can be implemented on a dedicated platform in which the hardware and software are specifically designed for navigation purposes. Alternatively, a navigation system can be implemented on a general purpose computing platform (such as a personal computer, personal digital assistant, or a networked computer) using appropriate navigation-related software applications and data.

Navigation systems (including general purpose computing platforms that run navigation applications) provide a variety of useful features and services. For example, navigation systems used in vehicles can provide detailed instructions for driving to desired destinations thereby reducing travel times and expenses. Navigation systems and navigation applications can also search for businesses of a desired type and provide routing guidance to locations of such businesses. Navigation systems and navigation applications can also incorporate real-time traffic information. Navigation systems and applications may also be used by operators of vehicle fleets, such as trucking companies, package delivery services, and so on.

One consideration associated with navigation systems and applications is that geographic data used by the navigation systems become out-of-date. For example, new roads are built, businesses change locations, road construction closes roads, detours are established, museum and restaurant hours change, etc. It is expected that end users, such as vehicle owners who have navigation systems in their vehicles, will want to have the geographic data in their navigation systems updated from time to time.

One way to provide a navigation system user with updated geographic data is to replace the entire geographic database used by a navigation system with an entirely new version containing new, updated data. A consideration with this approach is that a relatively large portion of the data in the new geographic database will be the same as the data in the older version and therefore will not need to have been replaced.

Another way to provide navigation system users with updated geographic data is to provide the user with only the updated data and provide a mechanism whereby the updated data can be applied to the old geographic database. Embodiments for incrementally updating a geographic database are disclosed in U.S. Pat. No. 5,893,113, the entire disclosure of which is incorporated by reference herein.

Although the embodiments disclosed in U.S. Pat. No. 5,893,113 are satisfactory, there continues to be room for improvement. Accordingly, there exists a need for a way to provide for updating a geographic database used in a navigation system.

SUMMARY OF THE INVENTION

To address these and other objectives, the present invention includes a method and system for updating geographic databases used in systems that provide navigation-related features. An original version of a geographic database is formed in which the data are organized into parcels. An updated version of the geographic database is formed that includes updated data. The updated version is organized into parcels so that the data in each parcel of the updated geographic database represent the same features that were represented in a corresponding one of the parcels of the original version. Incremental update transactions are formed that identify the differences between the parcels of data contained in the updated version of the geographic database relative to the parcels in the original version. The incremental update transactions are transmitted to the systems that provide navigation-related features where they are used to form updated parcels which are used in place of the corresponding parcels from the original version.

DETAILED DESCRIPTION OF THE PRESENTLY PREFERRED EMBODIMENTS

I. Formation of Compiled Geographic Databases from a Master Geographic Database.

Figure 1:
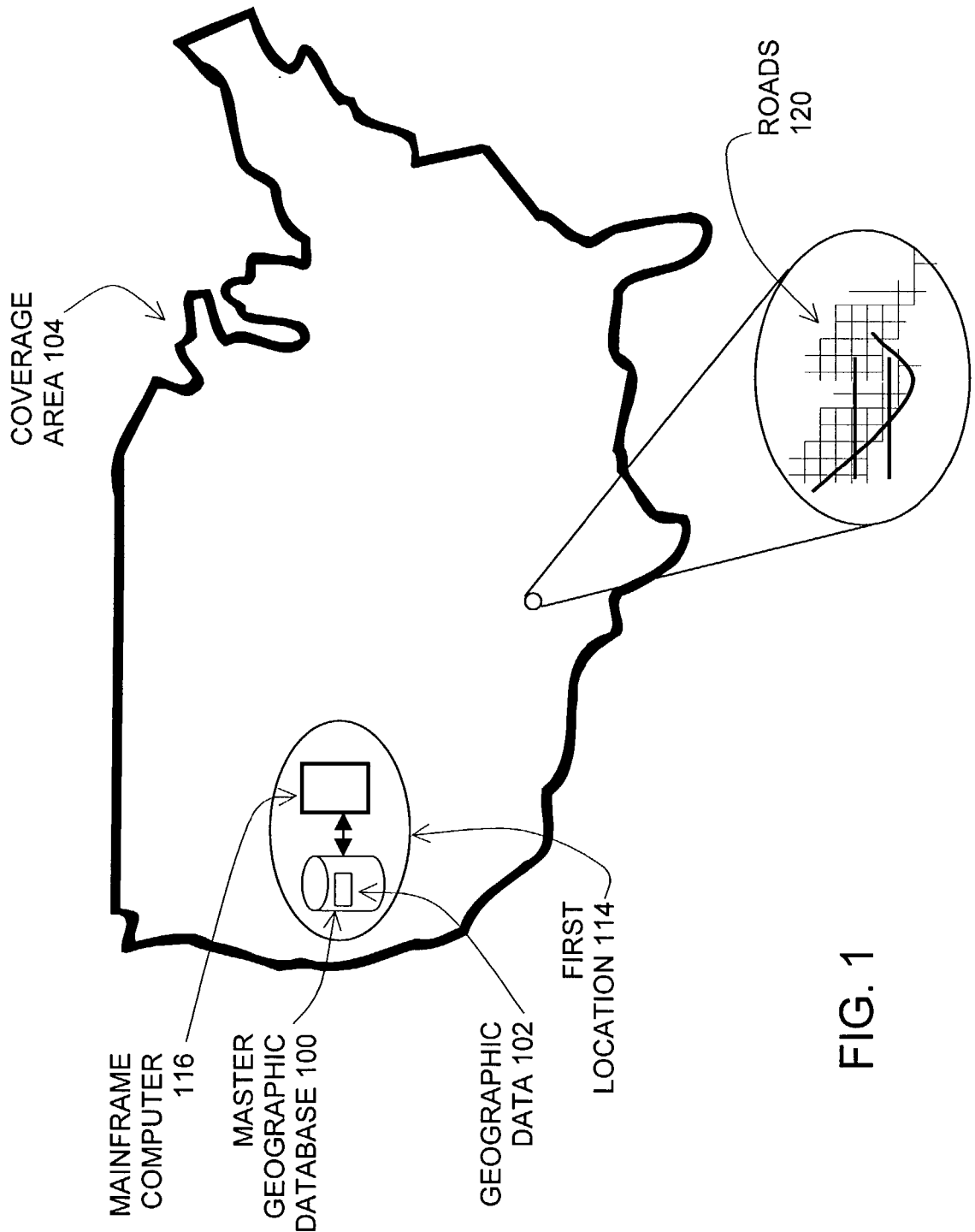
FIG. 1 is a diagram that illustrates a relationship between a master version of a geographic database and a coverage area.

FIG. 1 shows a master version of a geographic database 100. The master version of the geographic database 100 contains data 102 that represent geographic features in a coverage area 104. The coverage area 104 may correspond to an entire country, such as the United States. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the U.S. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 120 located in the coverage area 104. The data about the road network 120 include various kinds of information, such as the geographic coordinates of positions of the roads, street names of the roads, addresses ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities. The master version of the geographic database 100 may include other kinds of information.

The data about the geographic features in the coverage area 104 are collected by a geographic database developer, such as Navigation Technologies Corporation of Chicago, Ill. However, it is understood that the inventive concepts disclosed herein are not restricted to any particular source of data.

There are different ways used by the geographic database developer to collect data. These ways include obtaining data from other sources, such as municipalities. In addition, the geographic database developer employs field personnel to travel by vehicle along roads throughout the geographic region to observe features and record information about them. The data collected by the geographic database developer are stored in the master version of the geographic database 100.

The geographic database developer continues to collect data that represent the features in the geographic coverage area 104 on an ongoing basis. One reason that the geographic database developer continues to collect data is that the features in the coverage area 104 change over time. Accordingly, the geographic database developer collects data about the same features in order to update or confirm the previously collected data about the features. Another reason that the geographic database developer continues to collect data is to expand the coverage of the master version of the geographic database 100. For example, at one point in time the master version of the geographic database 100 may include data that represents only a portion of the entire coverage area 104. After that point in time, the geographic database developer collects data about features in areas that were not previously represented in order to expand the coverage of the master version of the geographic database 100.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the VSAM format and the GDF format, although other kinds of formats, both proprietary and non-proprietary, may be suitable. In general, the format of the master database 100 is not suitable for use in navigation systems.

A copy of the master version of the geographic database 100 is physically located at a first location 114. In one embodiment, the master version of the geographic database 100 is stored on one or more hard drives, tapes or other media, and accessed with an appropriate computer 116. Any suitable computer may be used, such as a mainframe computer, a plurality of networked microcomputers, etc.

Figure 2:
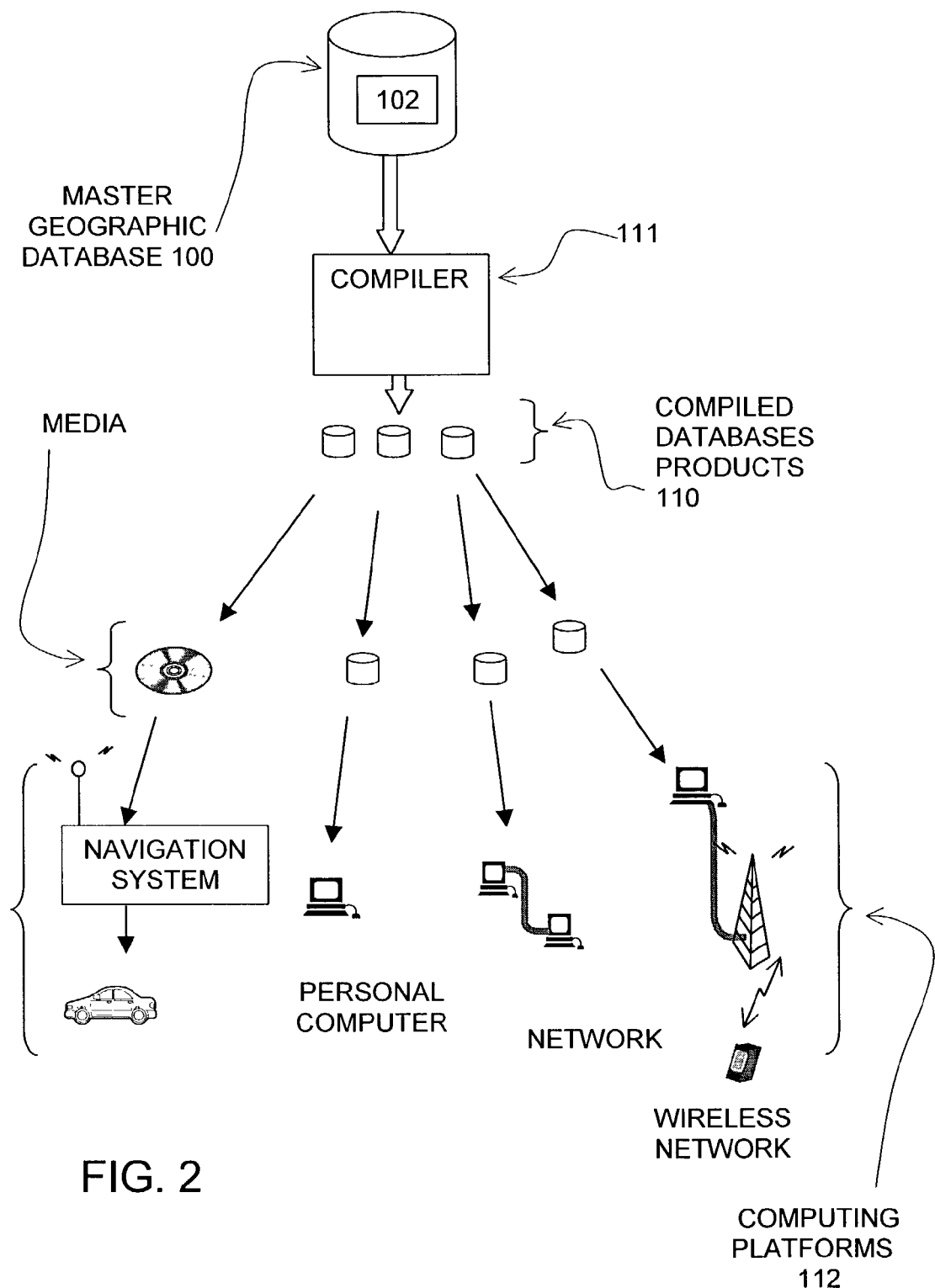
FIG. 2 is a diagram that illustrates formation of geographic database products from the master version of the geographic database shown in FIG. 1.

Referring to FIG. 2, the master version of the geographic database 100 is used to make compiled database products 110. The compiled database products 110 are made using a compiler 111. The compiler 111 is a software program run on an appropriate computer platform. The compiler 111 is described in more detail below.

The compiled database products 110 may include only portions of all the data in the master version of the geographic database 100. For example, the compiled database products 110 may include data that relate to only one or more specific sub-areas within the coverage area 104 of the master version of the geographic database 100. Further, the compiled database products 110 may include fewer than all the data attributes that describe geographic features represented in the master version of the geographic database 100.

The compiled database products 110 are used on various kinds of computing platforms 112. For example, the compiled database products 110 are used in navigation systems (such as in-vehicle navigation systems and hand-held portable navigation systems), personal computers (including desktop and notebook computers), and other kinds of devices, such as PalmPilot®-type devices, pagers, telephones, personal digital assistants, etc. The compiled database products 110 are also used on networked computing platforms and environments, including systems connected to the Internet.

The compiled database products 110 are stored on media that are suitable for the hardware platforms on which they are used. For example, the compiled database products may be stored on CD-ROM disks, hard drives, DVD disks, flash memory, or other types of media that are available now or that become available in the future.

On the computing platforms 112, the compiled database products 110 are used by various software applications. For example, the compiled database products 110 may be used by software applications that provide navigation-related functions, such as route calculation, route guidance, vehicle positioning, map display, and electronic yellow pages, as well as other kinds of functions.

II. Organization of the Compiled Geographic Databases

A. Overview

In the compiled databases 110, the geographic data are organized differently than in the master version of the geographic database 100. A compiled database is organized, arranged, structured and stored in a form that facilitates the use of the data in the computing platform in which it is installed. A compiled database may also be stored in a compressed format on the media on which it is located. Some of the ways in which geographic data can be organized for use in computing platforms are described in U.S. Pat. Nos. 5,951,620, 5,953,722, 5,968,109, 5,974,419, 6,038,559, 6,081,803, 6,038,559, 6,112,200, 6,118,404, 6,122,593, 6,184,823, 6,249,742, 6,308,177, 6,324,470, 6,336,111, and 6,393,149, the entire disclosures of which are incorporated by reference herein.

B. Representation of Roads

Figure 3:
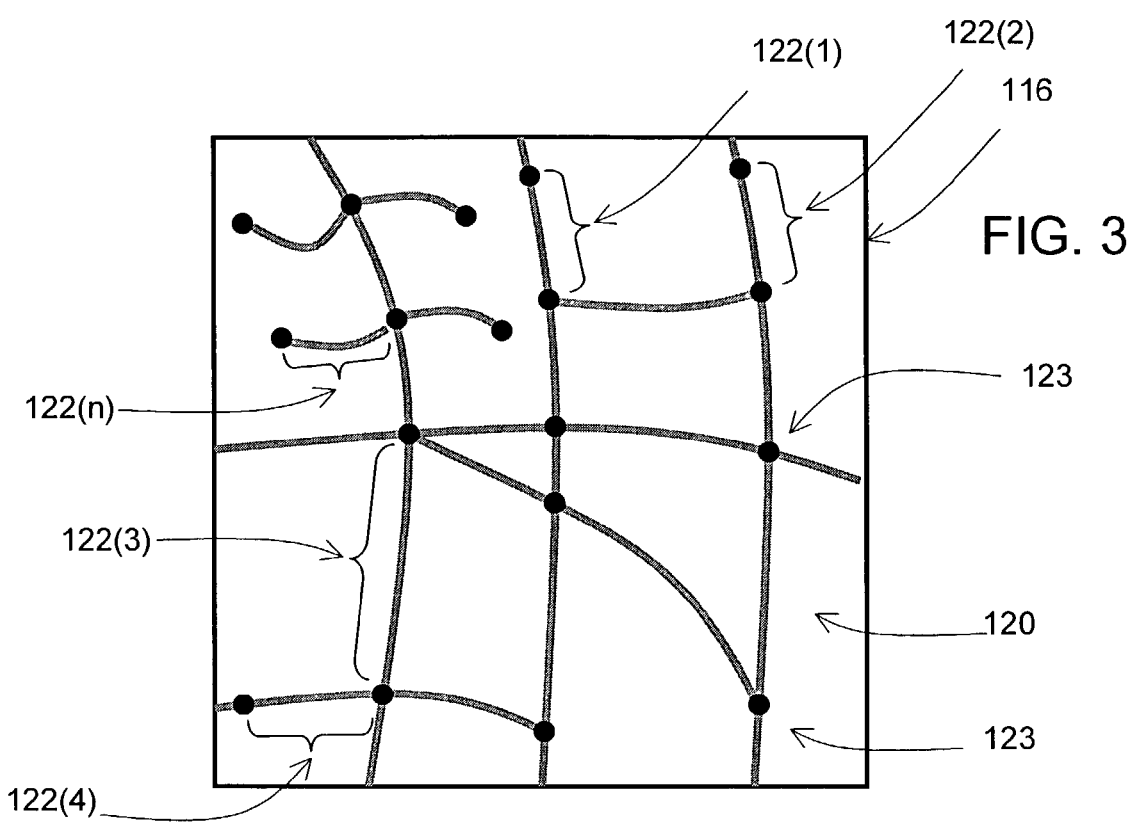
FIG. 3 is a map showing a portion of the coverage area of FIG. 1.
Figure 4:
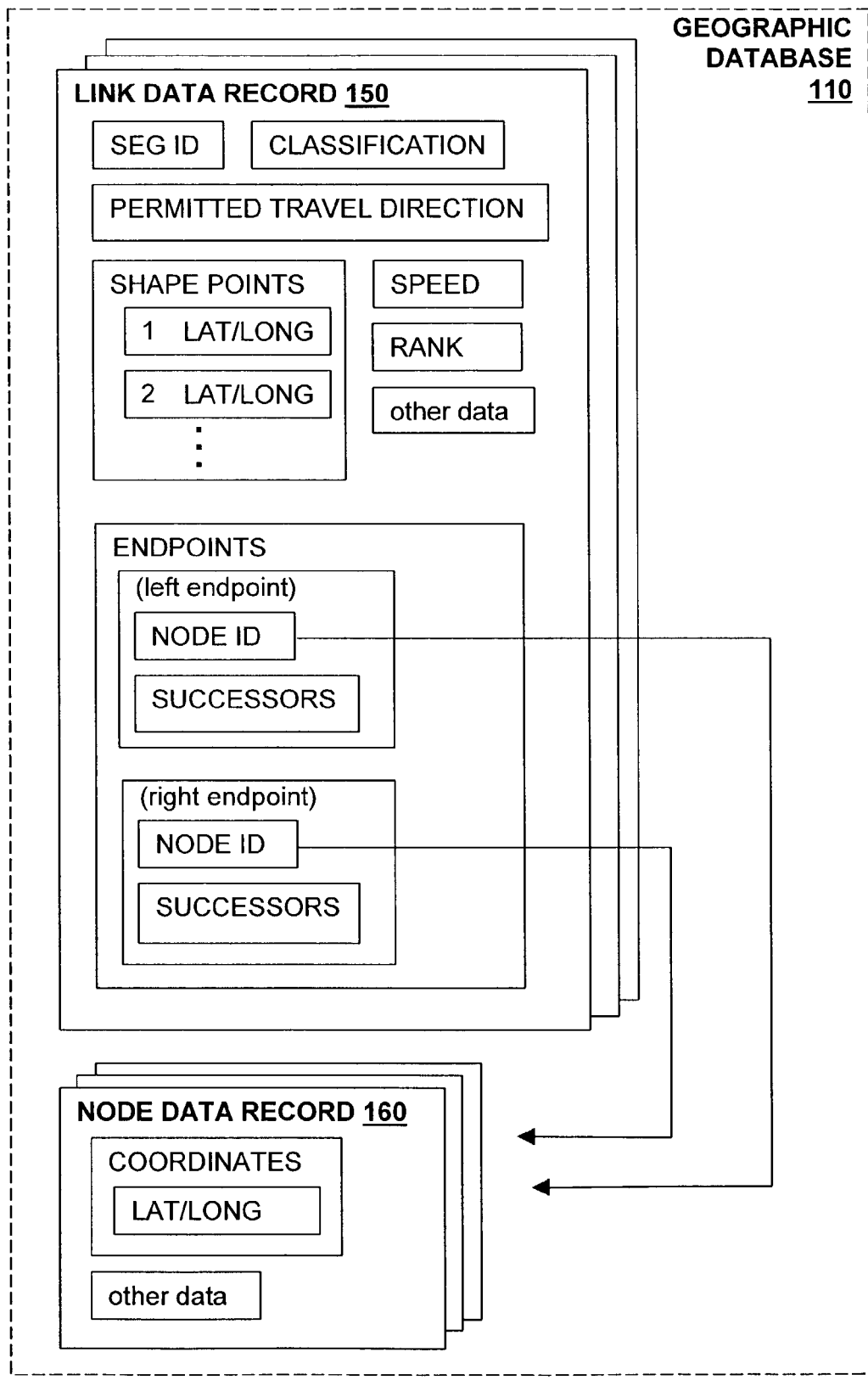
FIG. 4 is a block diagram that shows components of a data representation of one of the road segments (links) shown in FIG. 3.

FIGS. 3 and 4 show how roads are represented in geographic databases, such as the compiled database products 110 in FIG. 2. FIG. 3 shows an expanded view of a portion 116 of the coverage area 104 shown in FIG. 1. The portion 116 in FIG. 3 illustrates part of the road network 120 in the coverage area 104. The road network 120 includes, among other things, roads and intersections located in the coverage area 104. As illustrated in FIG. 3, each road in the coverage area 104 is composed of one or more links or segments, 122(1), 122(2) . . . 122(n). In one embodiment, a link is a portion of a road represented as data in the geographic database. In FIG. 3, each link 122 is shown to have associated with it two nodes, also referred to as "endpoints." One node represents the point at one end of the link and the other node represents the point at the other end of the link. The node at either end of a link corresponds to a location at which the road meets another road, e.g., an intersection, or where the road dead ends. An intersection may not necessarily be a place at which a turn from one road to another is permitted, but represents a location at which one road and another road have the same latitude, longitude and elevation. In some cases, a node may be located along a portion of a road between adjacent intersections, e.g., to indicate a change in road attributes, a railroad crossing, or for some other reason. (The terms "node" and "link" represent only one terminology for describing these physical geographic features and other terminology for these features is intended to be encompassed within the scope of these concepts.)

In one type of geographic database, there is at least one database entry (also referred to as "entity" or "record") for each represented link in the coverage area 104. FIG. 4 shows a link data record 150 that represents one of the links illustrated in FIG. 3. This link data record 150 has information (such as "attributes", "fields", etc.) associated with it that allows identification of the nodes associated with the link and/or the geographic positions (e.g., the latitude and longitude coordinates and/or altitude or elevation) of the two nodes. In addition, the link record 150 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents an other-than-straight road segment may include shape point data. A shape point is a location along a link between its endpoints. To represent the shape of other-than-straight roads, the geographic database developer selects one or more shape points along the other-than-straight road portion. Shape point data included in the link data record indicate the position, (e.g., latitude, longitude, and optionally, altitude or elevation) of the selected shape points along the represented link.

In the compiled geographic database, there may also be a node data record 160 for each node. The node data record 160 may have associated with it information (such as "attributes", "fields", etc.) that allows identification of the link(s) that connect to it and/or its geographic position (e.g., its latitude, longitude, and optionally altitude or elevation).

C. Separate Functional Types of Geographic Data

Figure 5:
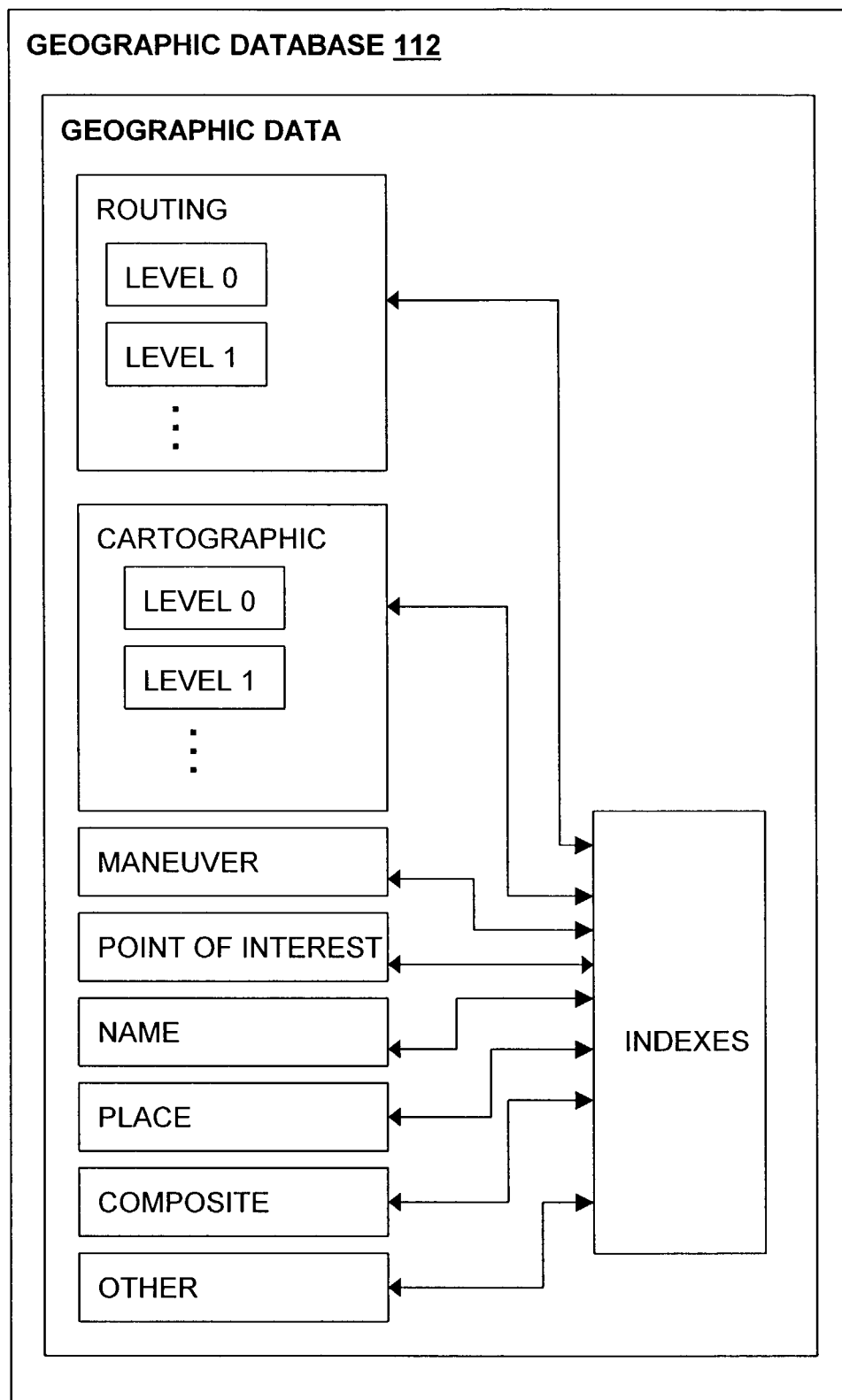
FIG. 5 is a block diagram that shows an embodiment for organizing the geographic database products of FIG. 2.

As mentioned above, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function, but excludes data and attributes that are not needed for performing the function. FIG. 5 illustrates one way of providing separate subsets of geographic data based on function. In FIG. 5, the compiled geographic database 110 is comprised of separate collections of routing data, cartographic data (for map display), maneuver data (for route guidance), point-of-interest data, and so on. The compiled geographic database 110 may be defined with fewer or more of these different types of data, and other types of data may be defined and included. In addition, one or more of these different types of data (or levels thereof, as explained below) may be combined into a composite type. To permit these subsets of data types to work together, one or more indexes are included that provide cross references, search trees, or other data finding techniques.

D. Levels of Geographic Data

Another way that the geographic data can be organized to enhance the use thereof is to provide the data in levels. Some of the navigation-related functions, such as the map display function and the route calculation function, may use data at different levels of detail. To implement different levels of data, each represented road segment is associated with a rank that corresponds to a functional class of road. Road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.

The rank of a represented road is used to specify the highest data level in which a data entity that represents the road is included. For example, referring to FIG. 5, the routing type data may include separate levels of the data, "level 0", "level 1", etc., each comprising a separate collection of the routing data with a different level of detail, and each of which can be used by the route calculation function. In the routing type of data, level 0 includes the link data records having a rank of "0" or higher, thus, level 0 includes link data entities corresponding to all the represented portions of all the roads in the geographic region. Level 1 of the routing data comprises a separate subset (or collection) of the routing data and includes only the link data entities having a rank of "1" or higher. Level 2 of the routing data comprises a separate subset of the routing data and includes only the link data entities having a rank of level 2 or higher, and so on. A highest level includes only records having a rank of n. Each higher level includes fewer records, however these records represent roads upon which travel is generally faster. Route calculation may be facilitated by using the higher levels of routing data, whenever possible, e.g., for portions of a route away from the origin or destination.

Similarly, the other types of data, such as the cartographic subset type, may include separate collections of the data, each with a different level of detail, which can be used by the map display function. Using these different levels of cartographic data, the map display function can provide rapid panning and zooming.

Although the organization of some of the data into levels results in some duplication of the data, the increased efficiency generally offsets any disadvantages. As with the use of separate functional types of data mentioned above, the need arises to allow these different levels to work together. The indexes, which include cross references, search trees, or other finding techniques, may be provided for this purpose.

E. Parcelization

Another way to facilitate use of the data in a compiled geographic database is to organize some or all of the data into parcels. Parcelization refers to organizing data in the geographic database into groupings such that the data in each grouping is located together physically and/or logically in the database, thereby facilitating access of the data together at the same time as a group. In one embodiment, a parcel contains data that are always accessed together. A parcel may be related to the quantity of data that can be accessed in a single disk access, although it may be related to some other factor. The size of a parcel may be related to the type of media upon which the geographic database is stored. In one embodiment, a parcel may be established to be approximately 100 Kilobytes of data. Other sizes of data may be used including 1 K, 2 K, 4 K, 8 K, 16 K, 32 K, 256 K, and so on. Within a geographic database, all the parcels may conform to a uniform parcel size, or alternatively, there may be more than one uniform parcel size.

F. Spatial Organization

Another way to facilitate use of the data in the compiled geographic database is to organize some of the data spatially. Spatially-organized data are arranged so that the data that represent geographically proximate features are located logically and/or physically proximate in the compiled database 110 and/or on the medium containing the database. One way to organize the data spatially is to parcelize the data spatially. When geographic data are parcelized spatially, features that are close together physically in the coverage area are represented by data in the same parcel.

Before forming spatial parcels, the data are first separated into the different functional types, such as routing, cartographic, composite, points of interest, and so on. Some of these kinds of data may be parcelized spatially in order to facilitate use of the data by the navigation functions and others of these kinds of data may not be parcelized spatially. In addition, if a type includes separate levels, the levels are formed before the data are parcelized.

There are a number of different procedures that can be used for spatially parcelizing geographic data. For example, a simple spatial parcelization method may provide for separating the geographic data into a plurality of parcels or groupings wherein the data in each parcel represent features encompassed within a separate one of a plurality of regular-sized rectangles which together form a regular, rectangular grid over the entire geographic region. Another method for spatial parcelization is to separate the data into parcels wherein the data in each parcel represent features encompassed within rectangular areas where each of the rectangles is formed by a bisection of rectangles encompassing parts of the region until a parcel size below a maximum threshold is obtained. In addition, spatial parcelization procedures are disclosed in U.S. Pat. Nos. 5,974,419 and 5,968,109, the entire disclosures of which are incorporated by reference herein.

Figure 6:
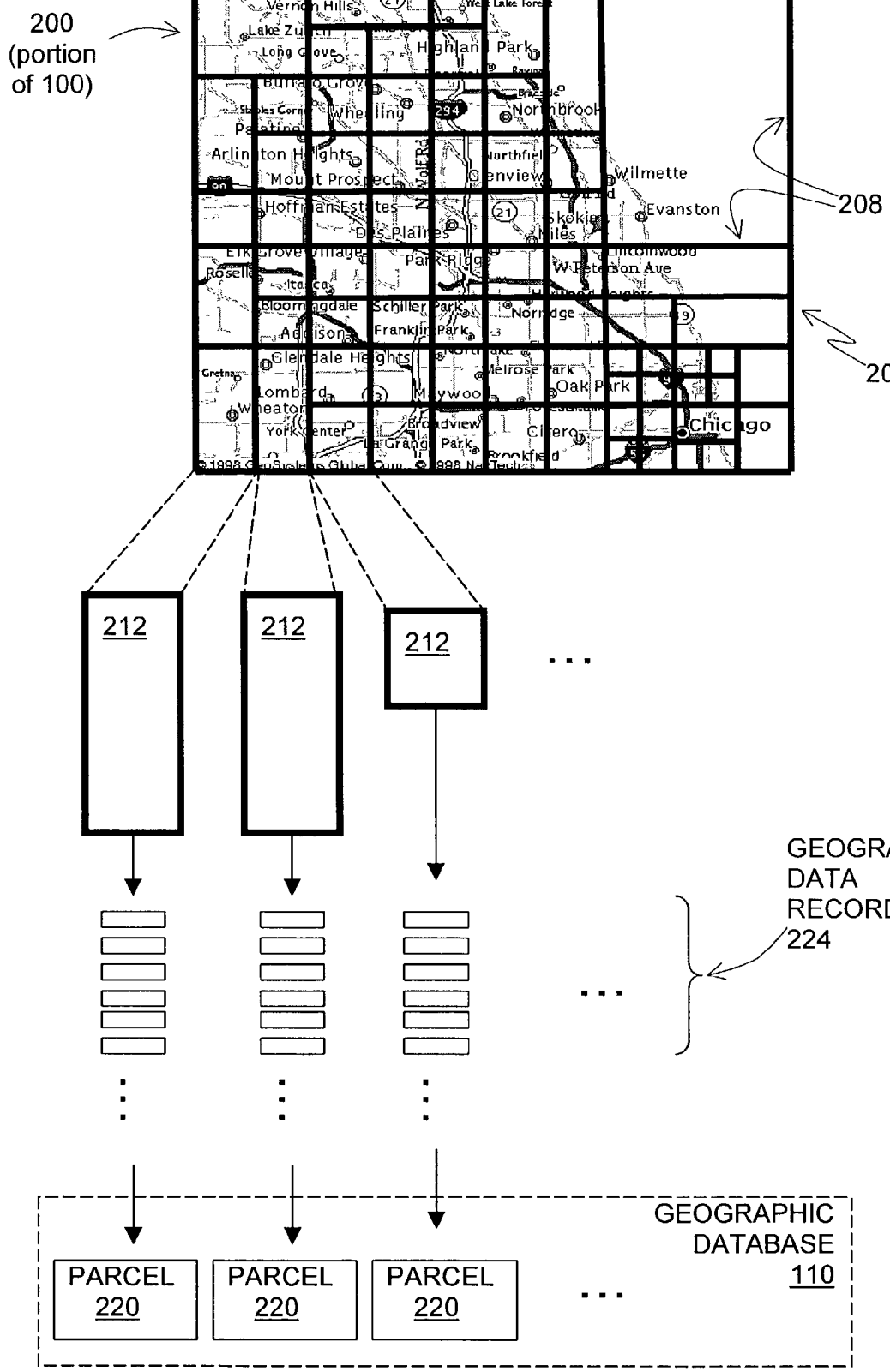
FIG. 6 is a diagram that illustrates spatial parcelization of one of the data products of FIG. 2.

FIG. 6 illustrates spatial parcelization of data contained in the compiled geographic database 110. FIG. 6 shows a map of an area 200. The area 200 is a portion of the coverage area 104 in FIG. 1. In FIG. 6, a grid 204 overlays the map. The grid 204 is formed of grid lines 208 that divide the portion 200 of the represented coverage area 104 into a plurality of sub-areas 212. (Thus, the geographic sub-areas 212 make up the entire coverage area 104.) In this embodiment, the areas 212 are rectangular; however, in alternative embodiments the areas 212 may have other shapes. The grid lines 208 of the grid 204 represent the boundaries of the areas 212. These sub-areas 212 may have different dimensions, as shown in FIG. 6. Alternatively, the areas 212 may all have the same dimensions. The dimensions of the sub-areas 212, as well as whether all the sub-areas 212 have the same dimensions, depend upon the procedure used for spatially parcelizing the data. Likewise, the locations of the boundaries of the sub-areas 212 depend on the procedure used for spatially parcelizing the data.

In this embodiment, each functional type of data and each level of a leveled functional type is separately spatially parcelized. When a type or layer is spatially parcelized, the individual data records 224 (of that type or layer) that represent the geographic features that are encompassed within each separate sub-area 212 are gathered together in a separate parcel 220 (or grouping) of data. Thus, each parcel 220 of data contains all the data records 224 (of that type or level) that represent the geographic features encompassed within a corresponding geographic sub-area 212.

As stated above, all the parcels 220 of a level or type may have a uniform parcel size, such as 1K, 2K, 4K, 8K, 16K, 32K, 100K and so on. The parcel size is determined based upon several factors, such as the media upon which the data are to be stored and/or the memory resources of the end users' computing platforms. In order to make each parcel conform to a uniform parcel size, the boundaries of the rectangular areas are selected so that the amount of data representing the features in a bounded area is less than the desired parcel size and then an amount of data padding ("0"s) is added to the data so that the parcel conforms to the desired uniform parcel size. A geographic database may include parcels of more than one uniform parcel size.

As shown in FIG. 6, the parcels 220 are stored to form the database 110 so that the data in each parcel 220 are logically and/or physically grouped together. A parcel 220 may represent the physical quantity of data that can be accessed at a time by the end user's system 112. When a parcel of data is accessed, all of its data records 224 are read from the medium into the memory of the system at the same time. With reference to the map of FIG. 6, this means that all the data records, such as the link records of a spatially organized type of data encompassed within each rectangular sub-area 212 are accessed together as a group. It can be appreciated that for certain kinds of navigation functions, it is desirable to have in memory at the same time all the data records that represent features that are physically close together in the geographic region.

G. Formation of New Types of Data Entities

Another way to facilitate use of the data in a compiled geographic database is to form new types of data entities. These new types of data entities do not exist in the master version of the geographic database. These new types of data entities are formed by the compiler (111 in FIG. 2), using the data from the master version of the geographic database. As an example, the performance of some navigation functions can be improved by representing several separate connected links with a single data entity. For example, in the cartographic data type (in FIG. 5), a continuous linear feature, such as a road, located in the geographic sub-area corresponding to a parcel of cartographic data, can be represented with a single data entity instead of a plurality of separate links represented by separate link data entities. Representing several connected links in this way may facilitate the map display process. Accordingly, during the compilation process, the compiler identifies connected links that can be represented in this manner (referred to as a "polyline") and forms a new type of data entity (i.e., a polyline data entity) to represent them. Each of the polyline data entities contains data which identify the two end points of the continuous linear geographic feature, data which identify one or more shape points located along the continuous linear geographic feature between the two end points, and data which identify the type of road or other feature the polyline entity represents. These polyline data entities are stored in the cartographic parcels. Further description of polylines can be found in U.S. Pat. Nos. 5,968,109 and 6,118,404, the entire disclosures of which are incorporated by reference herein.

In addition to polyline data entities, there are other types of data entities that can be formed during the formation of compiled geographic databases to represent combinations of geographic features that are separately represented in the master version of the geographic database. For example, aggregated segment data entities can be formed and stored in the routing type data to represent several separate connected links and supernode data entities can be formed and stored to represent a complex intersections. These types of data entities are described in U.S. Pat. No. 5,968,109.

H. Organization of Data within Parcels

As stated above, each parcel contains a collection of data records. In one embodiment, a parcel is organized internally to facilitate access the data records located therein.

Figure 7:
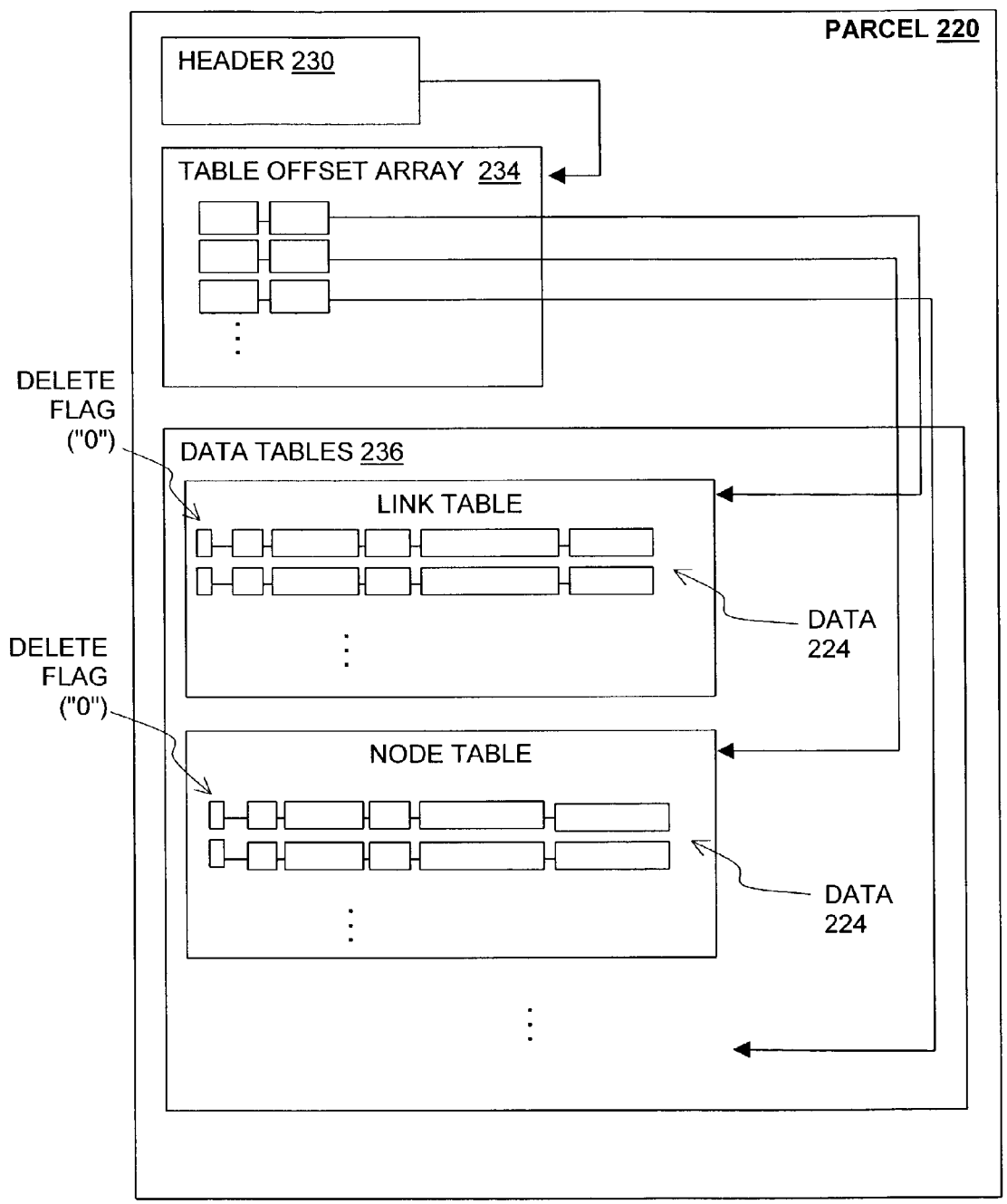
FIG. 7 is a block diagram that shows an embodiment for organizing the data contained in one of the data parcels of FIG. 6.

FIG. 7 is a diagram that shows an embodiment for the internal organization of a parcel. FIG. 7 shows one of the parcels 220 of FIG. 6. In FIG. 7, the parcel 220 includes a parcel header 230. The parcel header 230 contains some basic information about the parcel. The parcel header 230 includes an offset to a table offset array 234. The table offset array 234 contains an offset to the beginning of each table 236 within the parcel where data records 224 are located. For example, if there were two tables—the link table and node table—in a parcel, the table offset array would contain two entries. One entry would point to the beginning of the node table, the other entry would point to the beginning of the link table. To find link N, one would use the table offset array to get to the beginning of the link table, then go an additional (N−1) times the length of one link table entry.

Figure 8:
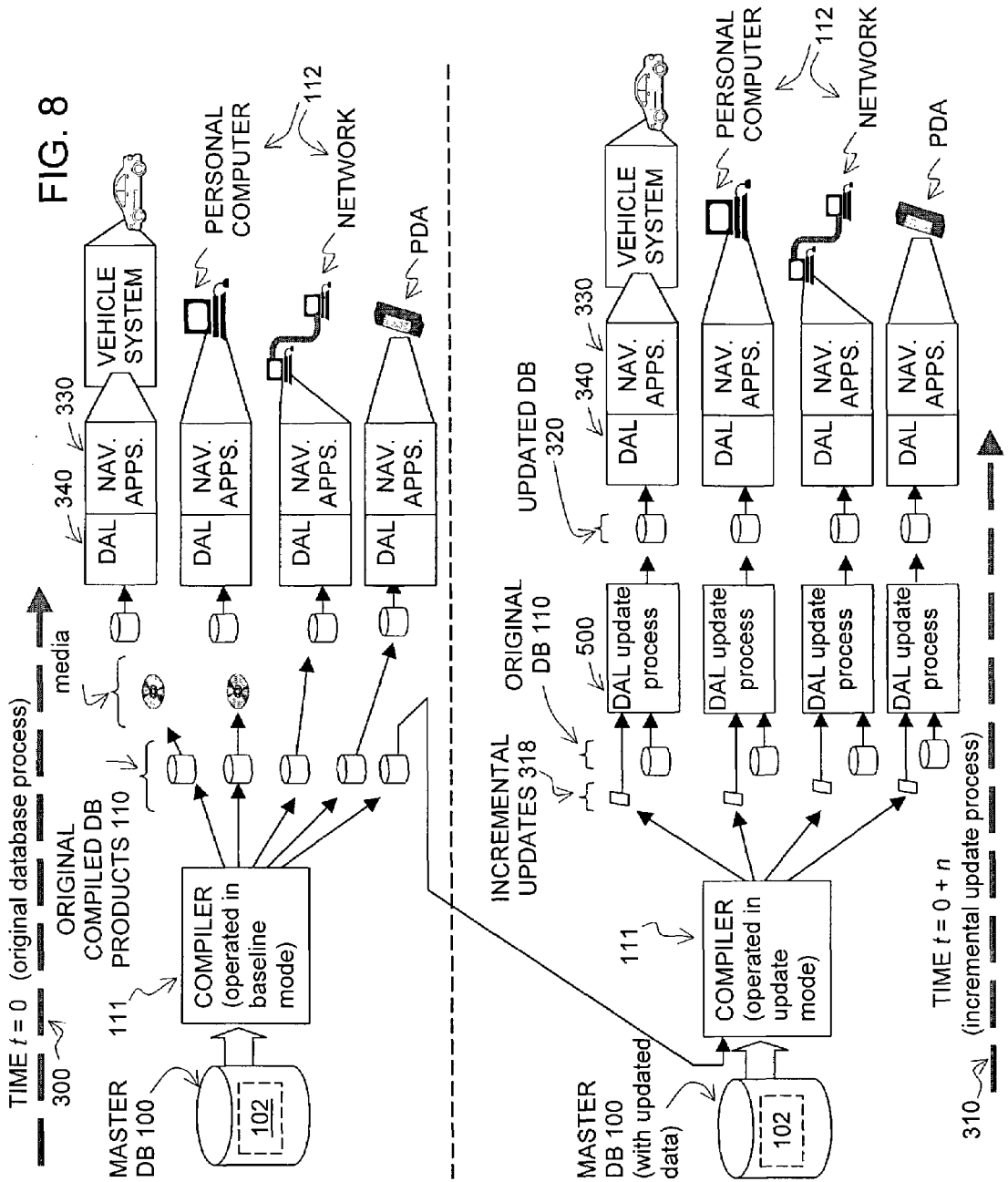
FIG. 8 is a diagram that shows a process for distributing original versions of the geographic database products of FIG. 2 and a process for updating the geographic database products.

III. Updating Compiled Geographic Databases Using Incremental Update Transactions A. Overview FIG. 8 is a diagram showing an overview of a system and method for updating the geographic databases 110 used in the end users' systems 112 (including general purpose computing platforms that run navigation applications) that provide navigation-related features or services. In FIG. 8, a first process 300 forms and distributes original versions of compiled geographic databases 110 for use in systems 112 that provide navigation-related features. The first process 300 is performed at a time, t=0. When the first process 300 is performed, the master geographic database 100 contains data at a first (or original version) level. At a later time (i.e., t=0+n), a second process 310 updates the original versions of compiled geographic databases 110 by forming, distributing, and applying incremental update transactions 318 to the original versions of compiled geographic databases 110 to form updated, compiled geographic databases 320.

B. Operation of the Compiler in Baseline Mode

The first process 300 includes the compilation process (performed by the compiler 111). The compilation process may be performed by the geographic database developer, i.e., the party who collects geographic data and updates the geographic database. Alternatively, the first process 300 may be performed by another entity.

As stated above, the compiler 111 obtains geographic data from the master geographic database 100. The compiler 111 organizes the data obtained from the master geographic database 100 into a format (or formats) to produce the compiled (or working) version of the geographic databases 110. The format of the compiled geographic databases 110 facilitates use of the geographic data in the end users' systems 112 for navigation-related purposes.

Figure 9:
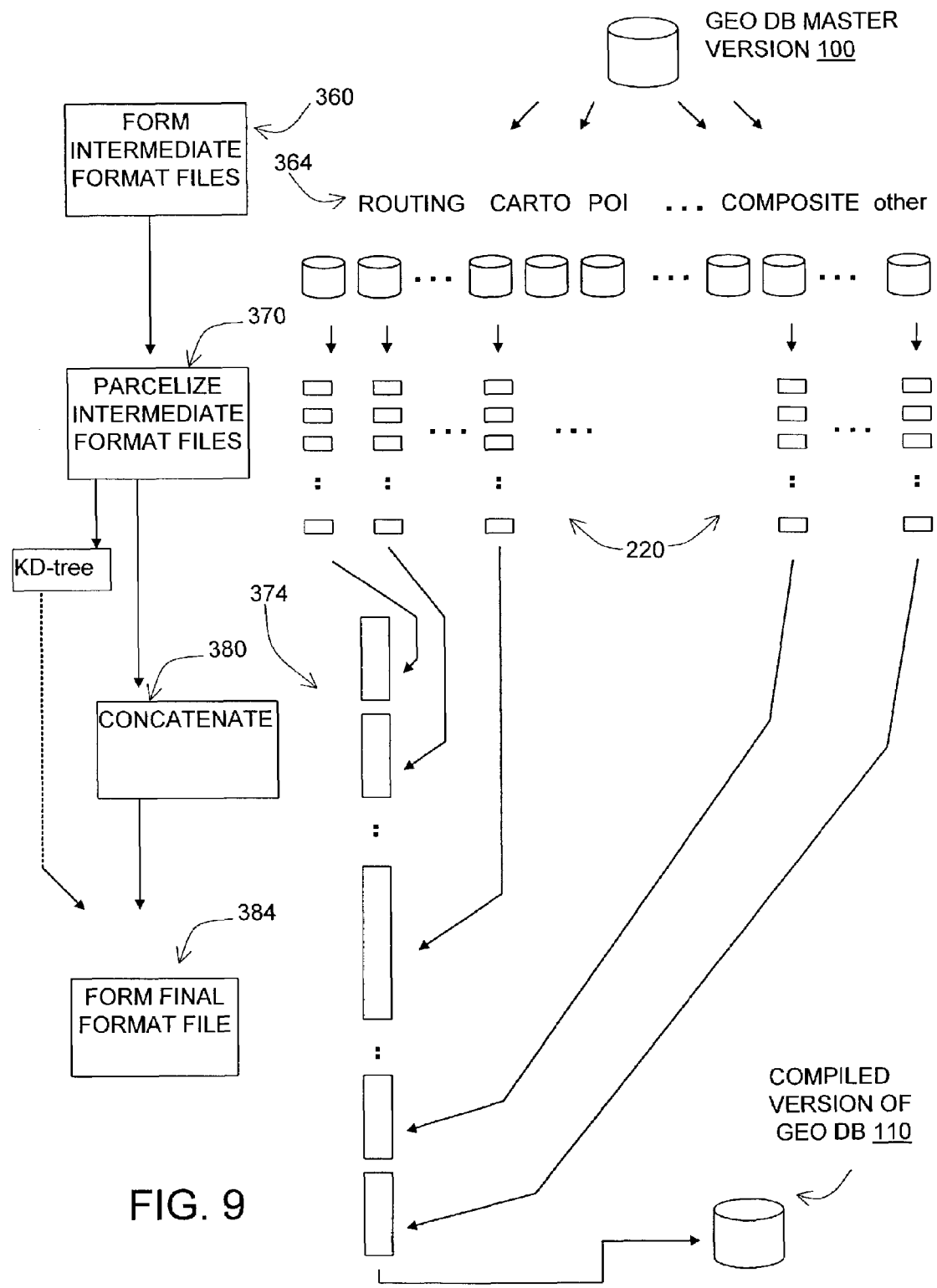
FIG. 9 shows additional steps in the baseline mode process shown in FIG. 8.

FIG. 9 shows a process performed by the compiler 111 operating in baseline mode. In baseline mode, the compiler 111 produces the original versions of the parcelized geographic databases that can be used in navigation systems 112.

When the compiler 111 is operated in baseline mode, it obtains data from the master geographic database 100. As mentioned above, the master geographic database is maintained in a generalized data format, such as GDF or VSAM. In step 360, separate intermediate format files 364 for each data type and layer are formed. These intermediate format files 364 formed from the master version of the geographic database 100 are created in order to derive each of the different types of data, such as routing, cartographic, point-of-interest, maneuver, and so on, as well as to derive each of the layers of some of these types.

After each of these separate intermediate format files 364 is created, each of these intermediate format files 364 is parcelized to form parcels the 220 of data records of each data type for each layer (at Step 370). Different kinds of parcelization processes can be used, including different kinds of processes for spatial parcelization, as described above. As the parcels 220 for each of the separate types and layers are formed, the parcels 220 each layer and type are concatenated into a single file 374 (at Step 380).

As the separate parcels 220 for each of the separate types and layers are formed, parcel identifications are assigned and parcel references throughout all the data records and indices are updated to reflect the new assigned parcel identifications to form a final format file 112 (at Step 384).

These general steps for forming a geographic database represent only one way that a geographic database can be formed and it is understood that there are other methods for forming geographic databases.

Referring again to FIG. 8, the original versions of the compiled geographic databases 110 are distributed, installed, or otherwise provided to the end users' computing platforms 112. The compiled geographic databases 110 may be stored on media for this purpose or provided to the end users' computing platforms by other means. When the compiled geographic databases 110 are installed on the end users' computing platforms 112, the data contained in the geographic databases 110 are used by software applications 330 run on the end users' computing platforms 112 to provide navigation-related features and services.

In order to access the data contained in the compiled geographic database 110, an end user's computing platform 112 includes a data access layer 340. The data access layer 340 is a software program run on the end user's computing platform 112 that responds to requests from the navigation applications 330 for geographic data, locates and accesses the needed geographic data from the geographic database 110, performs any necessary decompression, and provides the geographic data to the requesting navigation application 330. Embodiments of a data access layer are described in U.S. Pat. Nos. 6,047,280 and 6,073,076, the entire disclosures of which are incorporated by reference herein.

C. Updating Process (1). Overview

Referring to FIG. 8, after the first process 300 is performed to distribute original versions of the compiled geographic databases 110 to the end users, the geographic database developer continues to collect data. The geographic database developer collects new data relating to features in new geographic areas, i.e., areas that were not represented by the master version 100 of the geographic database when the first process 300 was performed. The geographic database developer also collects updated and/or more detailed data relating to features that were represented in the original version of the master geographic database 100. The new and updated data collected by the geographic database developer are applied and/or added to the master version of the geographic database 100.

As a result of the continuing collection of data by the geographic database developer, after a period of time the data in the master geographic database 100 is at a second (or later) version level. This later version level reflects the changes to the master database 100 made by the geographic database developer since the time of the original version. Accordingly, the later version level is an updated version relative to the original version. The second process 310 is performed in order to cause the end users' copies of the compiled geographic database to reflect some or all of the changes made to the master copy of the geographic database 100 since the time of the first process 300. The second process 310 is performed at a time n after the first process 300. Any amount of time can pass between when the first process 300 is performed and when the second process 310 is performed. For example, the time between the first process and the second process can be minutes, weeks, months, or even years. Further, it is understood that the original distribution 300, as well as the updating process 310, may take place over a period of time or may be different for different users and thus the amount of time between the first process and the second process may take on more than one value. In addition, the second process 310 can be performed more than once with respect to the original distribution of geographic databases 110, i.e., the original databases can be updated multiple times using the second process 310.

(2). Operation of Compiler in Update Mode

The second process 310 includes several component parts. Parts of the second process are performed with the compiler 111. When the compiler 111 operates as part of the update process 310, it operates in update mode. When the compiler 110 operates in update mode, it forms updated parcels, identifies the differences between the updated parcels and the original (referred to as "baseline parcels") parcels, and forms update transactions that represent the differences in compressed form. The steps performed by the compiler in update mode are explained in more detail below.

a. Formation of Updated Parcels

In update mode, the compiler 111 obtains geographic data from the master geographic database 100. The data obtained from the master geographic database 100 are different (i.e., updated) relative to when the compiler 111 obtained data in the first process 300.

In update mode, the compiler 111 forms a corresponding updated parcel for each baseline parcel that contains data which have been updated. When operating in update mode, the parcel compiler 111 attempts to generate the updated parcels so that they differ minimally from their corresponding baseline parcels. For example, when the compiler 111 operates in update mode, it forms parcels so that the data in the updated parcel represent the same geographic features as the data in the corresponding baseline parcel. Accordingly, with respect to spatially organized parcels, the compiler 111 uses the same boundaries for the rectangular area associated with each updated parcel that were used for the corresponding baseline parcel. Likewise, for parcels of data that are not spatially organized, the compiler 111 groups into updated parcels data that represent the same geographic features that were represented in corresponding baseline parcels.

With respect to spatially organized parcels, one way to ensure that the same parcel boundaries are used is to provide a copy of the original compiled geographic database 110 as an input to the compiler 111 when it is operating in update mode. The compiler 111 can determine the parcels boundaries from the baseline parcels contained in the original compiled geographic database and then use the same boundaries when forming the updated parcels. Alternatively, the compiler 111 may include a mechanism for saving parcel and section boundaries. Another way to form the updated parcels so that they represent the same geographic features as corresponding baseline parcels is to add a cross-reference between data entity identifiers contained in the master version of the geographic database 100 and table entry indices in the baseline parcels of the compiled geographic database 110. In general, either the compiled baseline parcels or everything necessary to regenerate them are provided as an input to the compiler 111 when it is operated in update mode.

In addition to grouping data in each updated parcel that represent the same features that were represented by data in a corresponding baseline parcel, the compiler also restricts certain internal differences between the baseline parcels and the updated parcels. In forming the updated parcels, the compiler 111 limits differences between the baseline parcel and the updated parcel to one of the following two types: (a) changes in place that do not shift the data following it up or down and (b) additions at the end of the parcel.

As an example, when a link represented in a baseline parcel is split (i.e., represented as two links in the updated parcel), it is preferable to delete the original link and create two new links. It may also happen at times that a link in the baseline parcel is not present in the updated parcel. In either of these cases, physically deleting a link from the middle of the link table would cause the remainder of the table in the updated parcel to be shifted upwards relative to the baseline parcel. For this reason, a one-bit delete flag is added to each table. This delete flag is used to indicate that a corresponding entry is dropped in the updated parcel relative to the baseline parcel. FIG. 7 shows a delete flag 400 associated with each data entry in the data table. (This flag is not compressed to zero bits but has a width of one bit for every entry in the baseline and updated parcel.)

The delete flag 400 in each table entry is used to indicate whether the entry has been deleted. The delete flag is set to 0 (false) in the baseline parcel but set to 1 in an updated parcel if that table entry has been deleted in the update parcel. The remainder of the table entry in the updated parcel is left the same as in the baseline parcel even though the entry has been deleted and thus will not be used. Leaving the remainder of the table entry the same minimizes the differences between the baseline and updated parcels.

In general, there is no room immediately after a given table in the baseline parcel to add new entries. If new entries were added to a table, it is possible that the compressed width of a field in a new table entry would exceed the width of that field in the baseline table. Accordingly, a second table of the same type containing the additional entries is generated and placed at the bottom of the updated parcel. The tables containing the new entries are pointed to by a second table offset array. In this embodiment, the current table offset array is modified to contain a pair of offsets for each table type so that the second offset for each type would be zero unless the updated parcel contained a table of additional entries for that type.

As an example, assume that a single new link has been added to the geographic area corresponding to a parcel since the baseline parcel was created. If the compiler were operated according to prior methods, the link could be placed anywhere in the link table of the parcel and could be placed in any polyline in the polyline table of the parcel. In the present embodiment, when the compiler is operated in update mode, the compiler adds the new link at the end of the baseline link table and places the new link—in a polyline by itself—at the end of the baseline polyline table.

Figure 10:
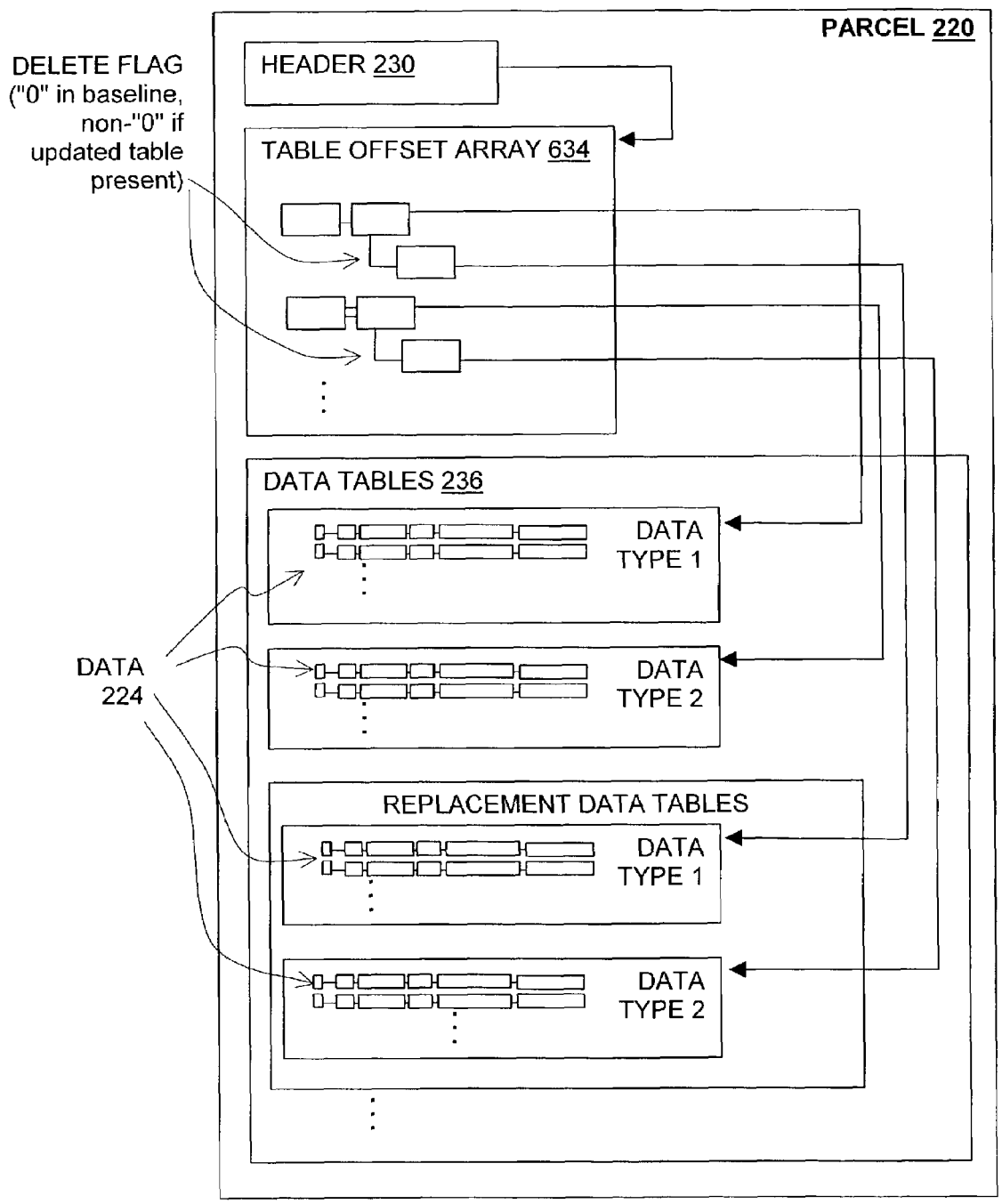
FIG. 10 is a diagram that shows the components in an embodiment of an updated parcel.

FIG. 10 is a diagram that shows the components in an embodiment of an updated parcel. In this embodiment, the table offset array 634 contains two entries for each data table type present in the parcel. If records were added in the updated parcel for a particular data type, the second offset in an entry would be non-zero and would point to the (second) table of additional records of that type. For efficiency, the table offset array 634 may also contain a count of records in the first of the two tables of each type. To find a link N, the table offset array entry for the link data type is used. If the count (in the table offset array entry) of link records in the first link table is K and if N is less than or equal to K, the first link table offset is used to get to the beginning of the first link table. Then, the link N can be found at an additional (N−1) times the length of one link table entry. On the other hand, if N is greater than K, the second link table offset is used to get to the beginning of the second link table. Then, the link N can be found at an additional (N−K−1) times the length of one link table entry.

b. Formation of Update Transactions

After forming the updated parcels as described above, the compiler 111 forms an incremental update transaction. An incremental update transaction is a representation of the differences between a baseline parcel and its corresponding updated parcel.

(i). Formation of Masks

In forming the incremental update transaction, the differences between the baseline parcel ("B") and its corresponding updated parcel ("U") are identified. When the baseline parcel B and the corresponding updated parcel U are not identical, the compiler 111 forms two bit masks—M1 (the same size as the baseline parcel B) and M2 (the same size as the updated parcel U)—such that when the baseline parcel B is logically ANDed with M1 and the result is logically ORed with M2, the end result is the updated parcel U, i.e., $$((B \ \& \ M1) | M2) = U.$$

The masks M1 and M2 are generated by a bit-by-bit comparison between the baseline parcel B and the updated parcel U. The following table defines each bit in the two-masks:

| Baseline Parcel Bit | Updated Parcel Bit | M1 Bit | M2 Bit |
|---|---|---|---|
| 0 | 0 | 1 | 0 |
| 0 | 1 | 1 | 1 |
| 1 | 0 | 0 | 0 |
| 1 | 1 | 1 | 0 |

When a bit in the baseline parcel B is 1 and the corresponding bit in the updated parcel U is 0, mask M1 turns the bit off. When a bit in the baseline parcel B is 0 and the corresponding bit in the updated parcel U is 1, mask M2 turns the bit on. Neither mask affects the bits where the two parcels match.

Figure 11:
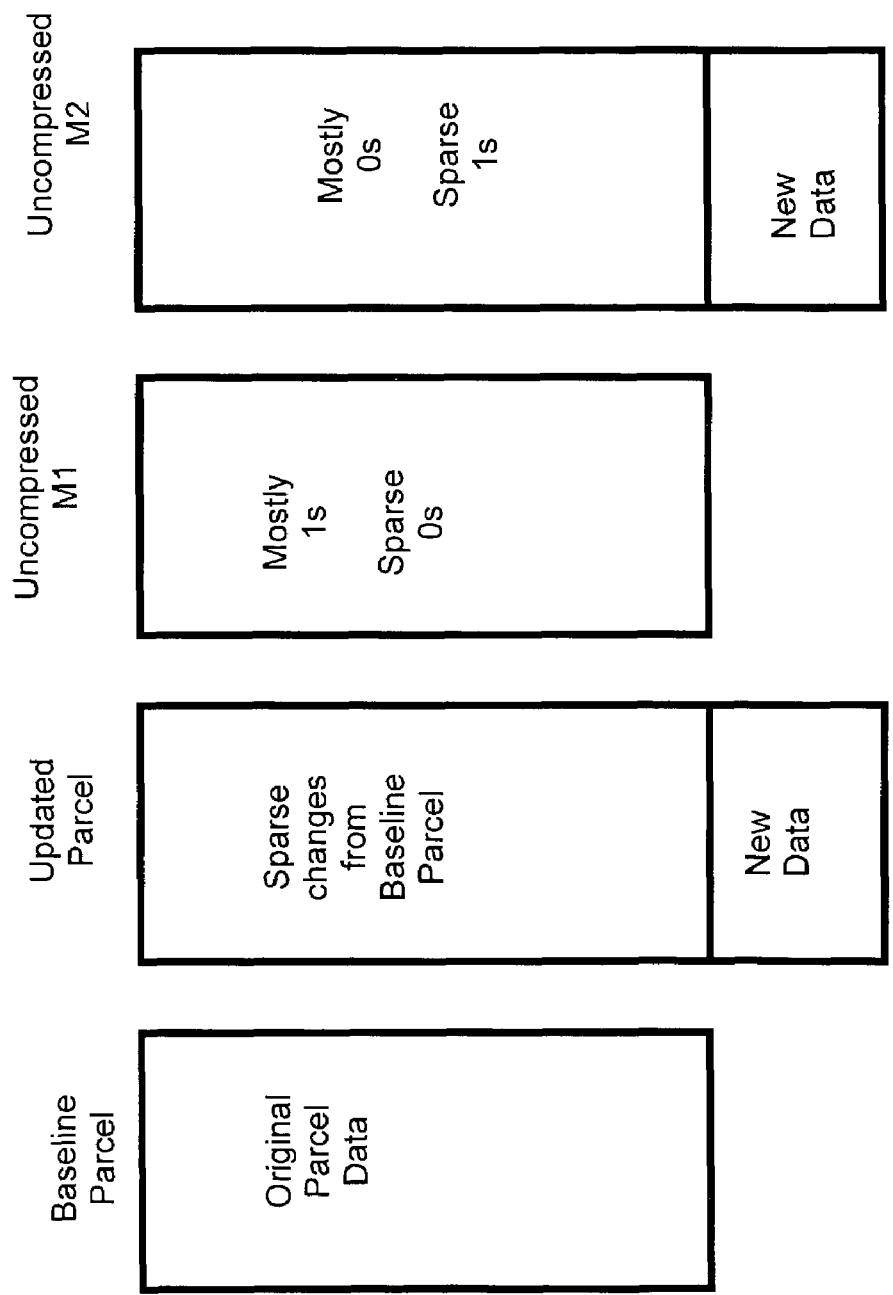
FIG. 11 is a diagram that shows relationships among the baseline parcel, updated parcels and bit masks formed by the update mode process of FIG. 8.

FIG. 11 is a diagram illustrating the relationships among B, U, M1, and M2.

(ii). Compression of Masks

Because of the way that the compiler restricted the kinds of changes permitted in updated parcels, i.e., to changes in place that do not shift the data following it up or down and additions at the end of the parcel, bit mask M1 is generated so that it is mostly 1s and bit mask M2 is generated so that it is mostly 0s. M1 and M2 are each therefore highly compressible. The compiler 111 compresses M1 and M2 using any compression algorithm that squeezes out strings of 0s or 1s efficiently. (Note that use of the single bit delete flag for deleted table entries, described above, helps minimize the differences between the baseline parcel and its corresponding updated parcel thereby contributing to their compressibility.)

c. Formation and Transmission of Update Transactions

Referring to FIG. 8, the compiler 111 uses the compressed versions of the masks M1 and M2 to form an incremental update transaction 318. The incremental update transaction 318 includes the compressed versions of the masks M1 and M2. A separate incremental update transaction is formed for each updated parcel.

The incremental update transactions 318 are transmitted to the end users' systems 112. An end user may be provided with incremental update transactions for all the parcels of data in the geographic database of the end user's system that need updating. Alternatively, the end user may be provided with fewer than all the incremental updates, e.g., for only those parcels that contain data that represent areas in which the end user normally travels or for which the end user has selected or subscribed.

Any suitable means of data transmission may be used for transmitting incremental update transactions including wireless transmission. As an example, the incremental update transactions may be sent wirelessly from the geographic database developer to the end users' systems. In this example, the end users' systems include the appropriate hardware and software to receive these incremental update transactions.

d. Formation of Updated Parcels from Incremental Update Transactions

Referring to FIG. 8, the updating process 310 continues in the end user's system 112. The end user's system 112 includes an updating application 500 that receives the update transactions. In one embodiment, the updating application 500 is part of the data access layer 340.

The updating application 500 in the end user's system 112 uses the data in the incremental update transaction 318 and the data in the corresponding baseline parcel B (which is already in the end user's system) to form the corresponding updated parcel U. The updating application 500 on the end user's system 112 performs the reverse of the operation performed by the compiler 111 to form the bit masks, M1 and M2, i.e., the updating application 500 decompresses the bit masks M1 and M2 and generates the updated parcel U from the baseline parcel B and the bit masks M1 and M2.

After the updating application 500 forms the updated parcel U, the updated parcel U is stored on a medium in the end user's system 112. The process performed by the updating application 500 is repeated for each separate incremental update transaction 318 received by the end user's system 112. The end user's system stores a separate updated parcel for each incremental update transaction it receives and decompresses.

The updating process is completed when all the incremental update transactions received by the end user's system have been formed into updated parcels. When the updating process is completed, updated parcels will have been formed and stored for some or all the original baseline parcels in the end user's system. The updated parcels and any remaining baseline parcels together form an updated geographic database 320.

e. Use of Updated Geographic Databases

The updated geographic database 320 is used by the end user's system to provide navigation-related features. When using the updated geographic database the updated parcels are used by the end user's system in place of the original parcels whenever there is a need for data contained in the parcels. When the system 112 is used to provide navigation-related features, the data access layer 340 accesses the updated parcel instead of the original parcel.

When using an updated parcel, the data access layer 340 ignores any table entry containing a delete flag equal to 1. Further, when using the updated parcel, the data access layer 340 treats a table of additional (i.e., replacement) entries as a continuation of the original table.

IV. Alternatives

A large number of changes to a parcel could cause the M1-M2 mask combination to exceed the size of the updated parcel U. In such a case, the entire parcel U (or a compressed version thereof) should be sent as the incremental update.

In some of the embodiments disclosed above, it was described that the incremental update transactions would be received by the end users' systems, decompressed in the end users' systems and stored on media located therein. In an alternative embodiment, the incremental update transactions could be received in systems other than the systems that provide navigation-related features or by parties other than end users. For example, in one alternative, an end user receives an incremental update transaction on a personal computer. A program on the end user's personal computer accesses the geographic database from the end user's navigation system and forms an updated parcel using the incremental update transaction and the data contained the geographic database from the end user's navigation system. The updated parcel is then stored on media which is used in the end user's navigation system.

In another alternative, a third party receives the incremental updates and forms the updated parcels (and possibly the entire updated geographic database) on behalf of the end user. As an example, an automobile dealership receives incremental update transactions for geographic databases installed in navigation systems of vehicles it has sold. The automobile dealership also has copies of the geographic databases installed in these navigation systems. The automobile dealership has an updating program similar to the updating application (500 in FIG. 8). Using the incremental update transactions and the copies of the geographic databases, updated geographic databases are formed at the automobile dealership. The automobile dealership installs the updated geographic databases in the end users' navigation systems.

In an embodiment described above, a parcel was described as having an internal structure that included a header, a table offset array, and tables of data records. In an alternative embodiment, a parcel may have a different internal structure, including different components. For example, instead of having a table offset array that points to tables of data records, a parcel may have one or more indexes. The indexes may be used to point to the appropriate data records within the parcel. A parcel with an internal index may be updated in a manner similar to the manner described above. If an entry in an index in a baseline parcel has to be modified or if new entries need to be added to the index, an updated parcel is formed with a new second index that includes the modified entry or the new entry. The new second index would be located at the end of the updated parcel. The original index and the new second index would be used together to find data records in the updated parcel.

V. Advantages

An advantage of some of the disclosed embodiments is that a relatively large amount of data (i.e., an entire geographic database) can be updated with a relatively small incremental update transaction. The disclosed embodiments for incrementally updating geographic databases using compressed versions of parcels address this consideration.

According to some of the presently disclosed embodiments, the size of an incremental update transaction is relatively small so that it approaches closely the size of the data actually changed or added to the original parcel.

An advantage associated with the disclosed embodiments is that the size of an incremental update transaction can be reduced if an incremental update transaction applies to an entire parcel rather than some smaller unit such as a record within a parcel. This advantage increases as the average size of a parcel increases.

The following example illustrates this advantage:

Case I: A database of 10,000 records is divided into 100 parcels, each containing 100 records, and one record in one parcel changes.

If the disclosed embodiment is not used, the incremental update transaction is one parcel, or 1 percent of the database. However, using the disclosed embodiment, the incremental update transaction (M1+M2) approaches the size of a single record, or 0.01 percent of the database.

Case II: A database of 10,000 records is divided into 10 parcels, each containing 1000 records, and one record in one parcel changes.

If the disclosed embodiment is not used, the incremental update transaction is one parcel, or 10 percent of the database. However, using the disclosed embodiment, the incremental update transaction (M1+M2) approaches the size of a single record, or 0.01 percent of the database.

The parcels in Case II are 10 times the size of those in Case I. If the disclosed embodiment is not used, the incremental update transaction in Case II is also 10 times the size of that in Case I. However, using the disclosed embodiment, the incremental update transaction is about the same size in both cases. So as illustrated in this example, the disclosed embodiment is 10 times as advantageous in reducing the size of the update transaction when the parcels are 10 times larger.

It is intended that the foregoing detailed description be regarded as illustrative rather than limiting and that it is understood that the following claims including all equivalents are intended to define the scope of the invention.

I claim:

1. A method of updating geographic databases used in systems to provide navigation-related features, wherein the geographic databases are at a first version level, wherein the geographic databases represent geographic features located in a coverage area, wherein each of the geographic databases is separated into parcels of data, the method comprising:

forming an updated parcel of data for each parcel in the geographic databases at the first version level that contains data that have been updated;

wherein the updated parcel of data is formed so that the geographic features represented by the data in the updated parcel correspond to those represented by the data in a corresponding parcel in the geographic database at the first version level; and providing an incremental update transaction to the systems that provide navigation-related features, wherein the incremental update transaction identifies differences between the corresponding parcel from the geographic database at the first version level and the updated parcel so that, in each of said systems that provide navigation-related features, a copy of the updated parcel of data can be formed from a copy of the corresponding parcel in the geographic database at the first version level and said incremental update transaction, and further wherein the updated parcel of data so formed is used in each of said systems that provide navigation-related features in place of said copy of the corresponding parcel in the geographic database at the first version level.

2. The method of claim 1 wherein the incremental update transaction includes a first data mask that identifies bits present in the corresponding parcel from the geographic database at the first version level and not present in the updated parcel and a second data mask that identifies bits present in the updated parcel and not present in the corresponding parcel from the geographic database at the first version level.

3. The method of claim 2 wherein said first data mask and said second data mask are compressed in said incremental update transaction.

4. The method of claim 3 wherein said first data mask and said second data mask are compressed by indicating consecutive counts of like bits.

5. A method of updating a geographic database used in a system that provides navigation-related features, wherein the system includes a geographic database at a first version level, wherein the geographic database represents geographic features located in a coverage area, and wherein the geographic database is separated into parcels of data, the method comprising:

obtaining an updated parcel of data for each parcel in the geographic database at the first version level that contains data that have been updated;

wherein the updated parcel of data is formed so that the geographic features represented by the data in the updated parcel correspond to those represented by the data in a corresponding parcel in the geographic database at the first version level and further wherein the geographic features represented by the data in the updated parcel are located within a geographic area having identical geographic boundaries as those encompassing the geographic area in which the geographic features represented by the data in the corresponding parcel in the geographic database at the first version level are located; and storing the updated parcel on a media with the system; and using the updated parcel of data instead of the corresponding parcel in the geographic database at the first version level.

6. The method of claim 5 wherein the updated parcel is obtained from an incremental update transaction that identifies differences between the corresponding parcel from the geographic database at the first version level and the updated parcel.

7. The method of claim 6 wherein the incremental update transaction is comprised of a first data mask and a second data mask, wherein the first data mask and the second data mask identify differences between the updated parcel and the corresponding parcel from the geographic database at the first version level.

8. The method of claim 7 further comprising:

decompressing the incremental update transaction to form the first data mask and the second data mask.

9. The method of claim 7 wherein the first data mask identifies bits present in the corresponding parcel from the geographic database at the first version level and not present in the updated parcel and wherein the second data mask identifies bits present in the updated parcel and not present in the corresponding parcel from the geographic database at the first version level.

10. The method of claim 9 further comprising:

forming the updated parcel by AND-ing from the first data mask with the result of OR-ing the second bit mask with the corresponding parcel from the geographic database at the first version level.

11. The method of claim 6 further comprising:

forming the updated parcel from the incremental update transaction and the corresponding parcel from the geographic database at the first version level.

* * * * *